United States Patent
Ikeda

(10) Patent No.: US 9,584,713 B2
(45) Date of Patent: Feb. 28, 2017

(54) IMAGE CAPTURING APPARATUS CAPABLE OF SPECIFYING AN OBJECT IN IMAGE DATA BASED ON OBJECT DETECTION, MOTION DETECTION AND/OR OBJECT RECOGNITION, COMMUNICATION APPARATUS COMMUNICATING WITH IMAGE CAPTURING APPARATUS, AND CONTROL METHOD THEREFOR

(71) Applicant: CANON KABUSHIKI KAISHA, Tokyo (JP)

(72) Inventor: Hitoshi Ikeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 14/566,203

(22) Filed: Dec. 10, 2014

(65) Prior Publication Data

US 2015/0172531 A1    Jun. 18, 2015

(30) Foreign Application Priority Data

Dec. 12, 2013 (JP) .................. 2013-257399

(51) Int. Cl.
*H04N 5/232* (2006.01)
*H04N 7/18* (2006.01)
*H04N 5/33* (2006.01)
*G03B 17/00* (2006.01)
(Continued)

(52) U.S. Cl.
CPC ...... *H04N 5/23206* (2013.01); *H04N 1/00307* (2013.01); *H04N 5/235* (2013.01); *H04N 5/23212* (2013.01); *H04N 5/23216* (2013.01); *H04N 5/23219* (2013.01); *H04N 5/23293* (2013.01)

(58) Field of Classification Search
CPC ...................................... H04N 5/232–5/23296
USPC ........ 348/211.1–211.9, 154–159; 396/56–59
See application file for complete search history.

(56) References Cited

U.S. PATENT DOCUMENTS

| 5,323,203 A * | 6/1994 | Maruyama ............. G03B 17/38 340/12.17 |
| 6,351,605 B1 * | 2/2002 | Ogi ........................ G03B 17/38 396/502 |

(Continued)

FOREIGN PATENT DOCUMENTS

| JP | 2007-325097 A | 12/2007 |
| JP | 2010-050746 A | 3/2010 |

*Primary Examiner* — Chia-Wei A Chen
(74) *Attorney, Agent, or Firm* — Cowan, Liebowitz & Latman, P.C.

(57) ABSTRACT

An image capturing apparatus comprises a communication unit configured to communicate with an external apparatus, an image capturing unit configured to generate image data by capturing an object, a setting unit configured to set a shooting condition, a specifying unit configured to specify an object in image data captured by the image capturing unit, wherein the object specified by the specifying unit is used to set the shooting condition by the setting unit, and a control unit configured to control the specifying unit so as to specify the object with less processing when shooting upon receiving an instruction from the external apparatus connected via the communication unit based on the object specified by the specifying unit as compared to a case in which shooting is performed by directly operating the image capturing apparatus.

9 Claims, 12 Drawing Sheets

(51) Int. Cl.
*H04N 1/00* (2006.01)
*H04N 5/235* (2006.01)

(56) References Cited

U.S. PATENT DOCUMENTS

| | | | | | |
|---|---|---|---|---|---|
| 2001/0042245 | A1* | 11/2001 | Iwamura | | G08C 23/00 725/1 |
| 2005/0132420 | A1* | 6/2005 | Howard | | G06F 3/017 725/135 |
| 2008/0284871 | A1* | 11/2008 | Kobayashi | | H04N 5/145 348/229.1 |
| 2009/0237513 | A1* | 9/2009 | Kuwata | | H04N 1/00236 348/207.1 |
| 2011/0187895 | A1* | 8/2011 | Cheng | | H04N 5/228 348/231.2 |
| 2012/0307091 | A1* | 12/2012 | Yumiki | | H04N 5/23203 348/211.4 |
| 2013/0039579 | A1* | 2/2013 | Ahn | | G06T 11/60 382/190 |
| 2014/0092218 | A1* | 4/2014 | Xu | | H04N 13/0221 348/46 |
| 2014/0098210 | A1* | 4/2014 | Larter | | G06F 3/012 348/77 |
| 2014/0132817 | A1* | 5/2014 | Sahoo | | H04N 5/23293 348/333.11 |
| 2014/0313358 | A1* | 10/2014 | Yu | | H04N 5/23222 348/211.7 |
| 2014/0368695 | A1* | 12/2014 | Sako | | H04N 5/23212 348/231.99 |
| 2014/0375862 | A1* | 12/2014 | Kim | | H04N 5/23245 348/333.02 |
| 2015/0049233 | A1* | 2/2015 | Choi | | H04N 5/232 348/333.01 |
| 2015/0146027 | A1* | 5/2015 | Ramachandran | | H04N 5/23206 348/211.3 |
| 2015/0319353 | A1* | 11/2015 | Kaneda | | H04N 5/23206 348/211.2 |
| 2015/0319354 | A1* | 11/2015 | Ichikawa | | G03B 15/00 348/211.2 |
| 2015/0381883 | A1* | 12/2015 | Kawai | | H04N 5/23293 348/333.08 |
| 2016/0080643 | A1* | 3/2016 | Kimura | | H04N 5/23206 348/207.1 |
| 2016/0198086 | A1* | 7/2016 | Kim | | H04N 5/23216 348/333.02 |

* cited by examiner

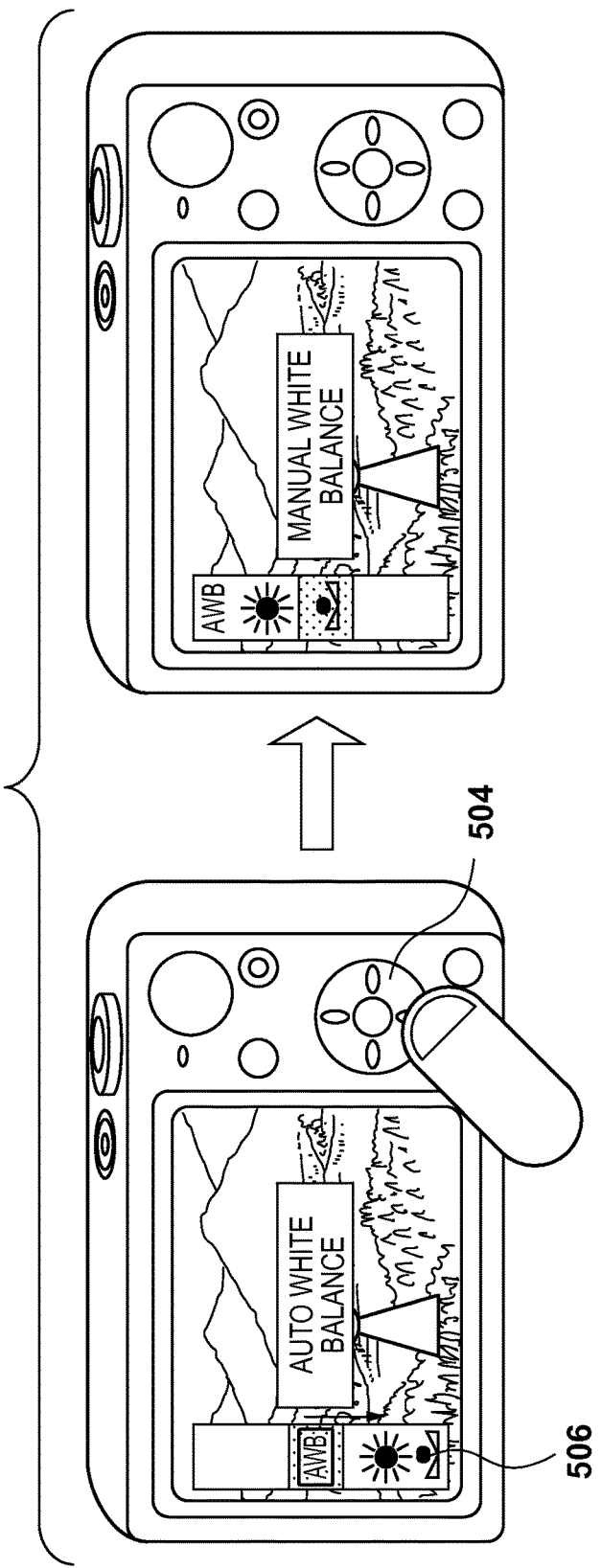

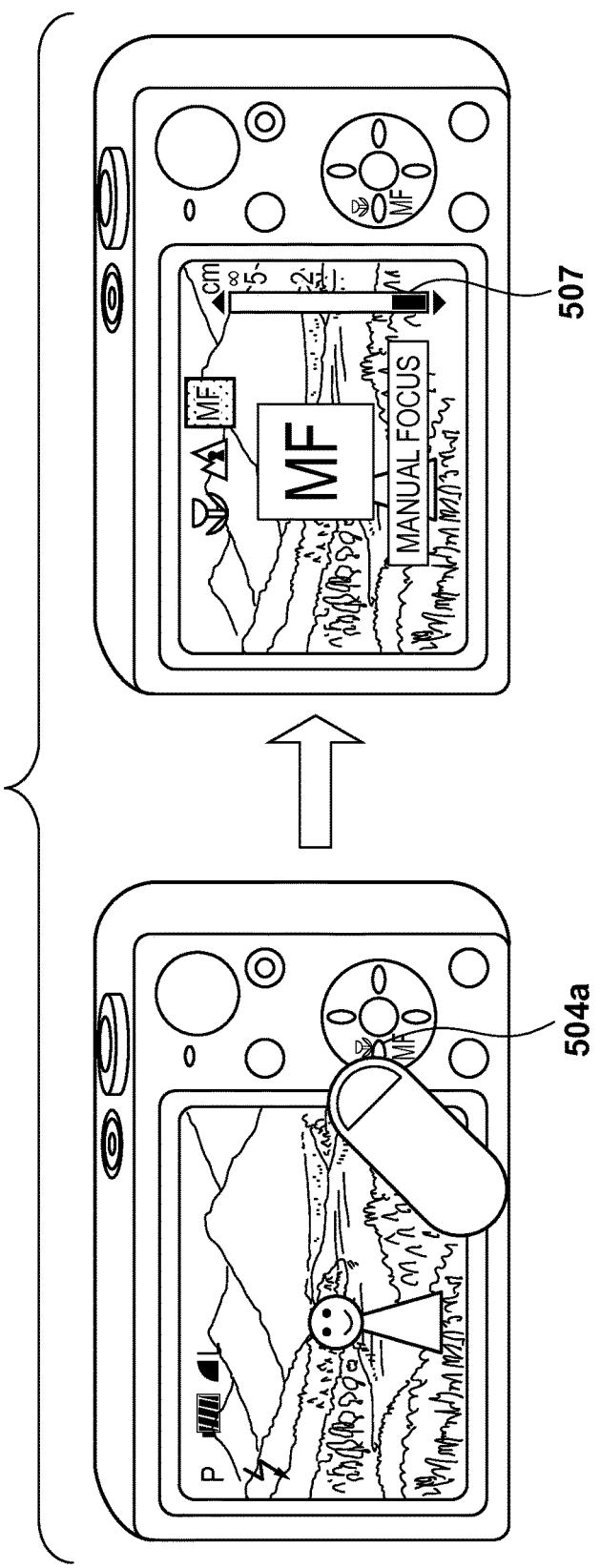

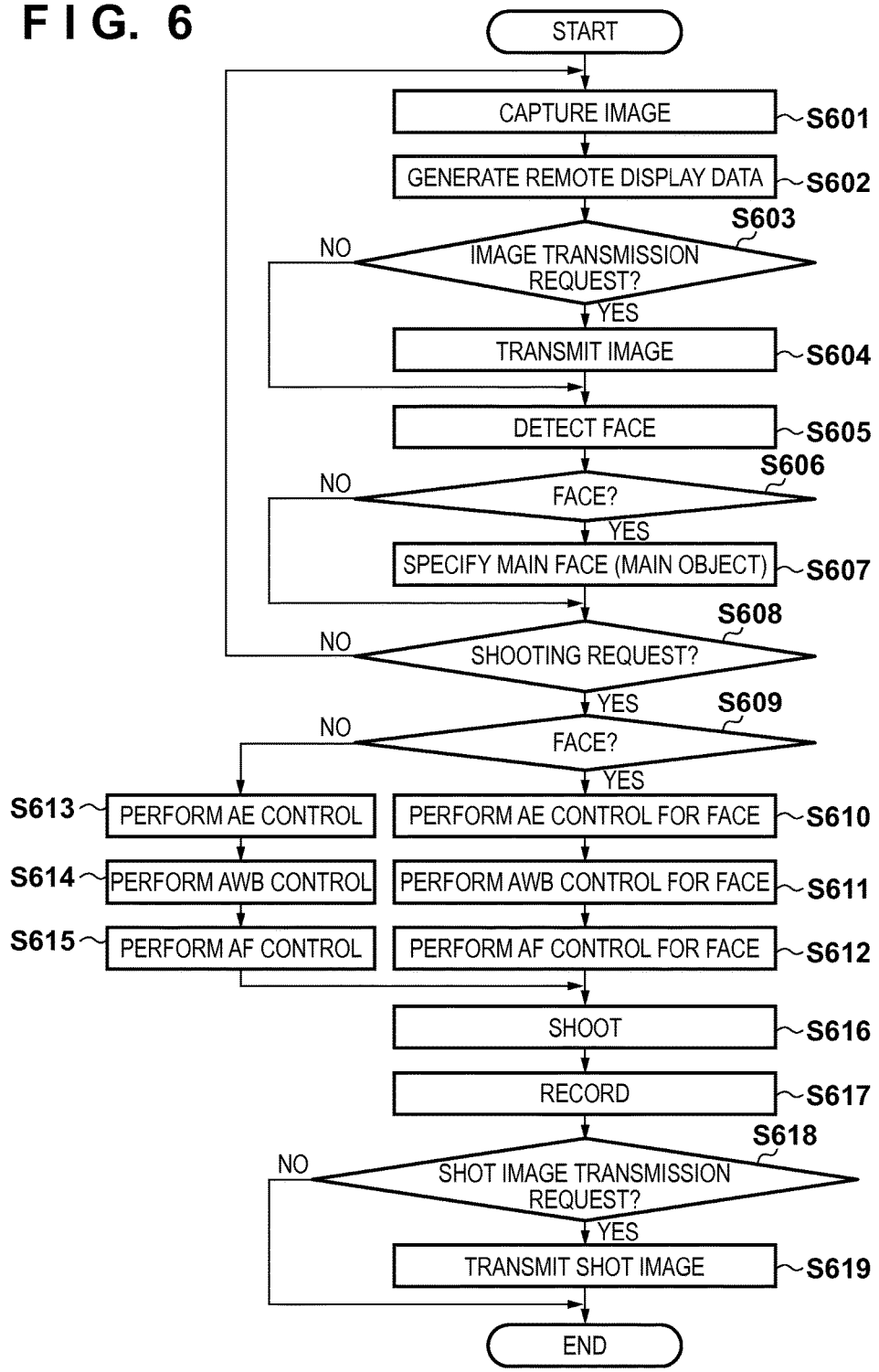

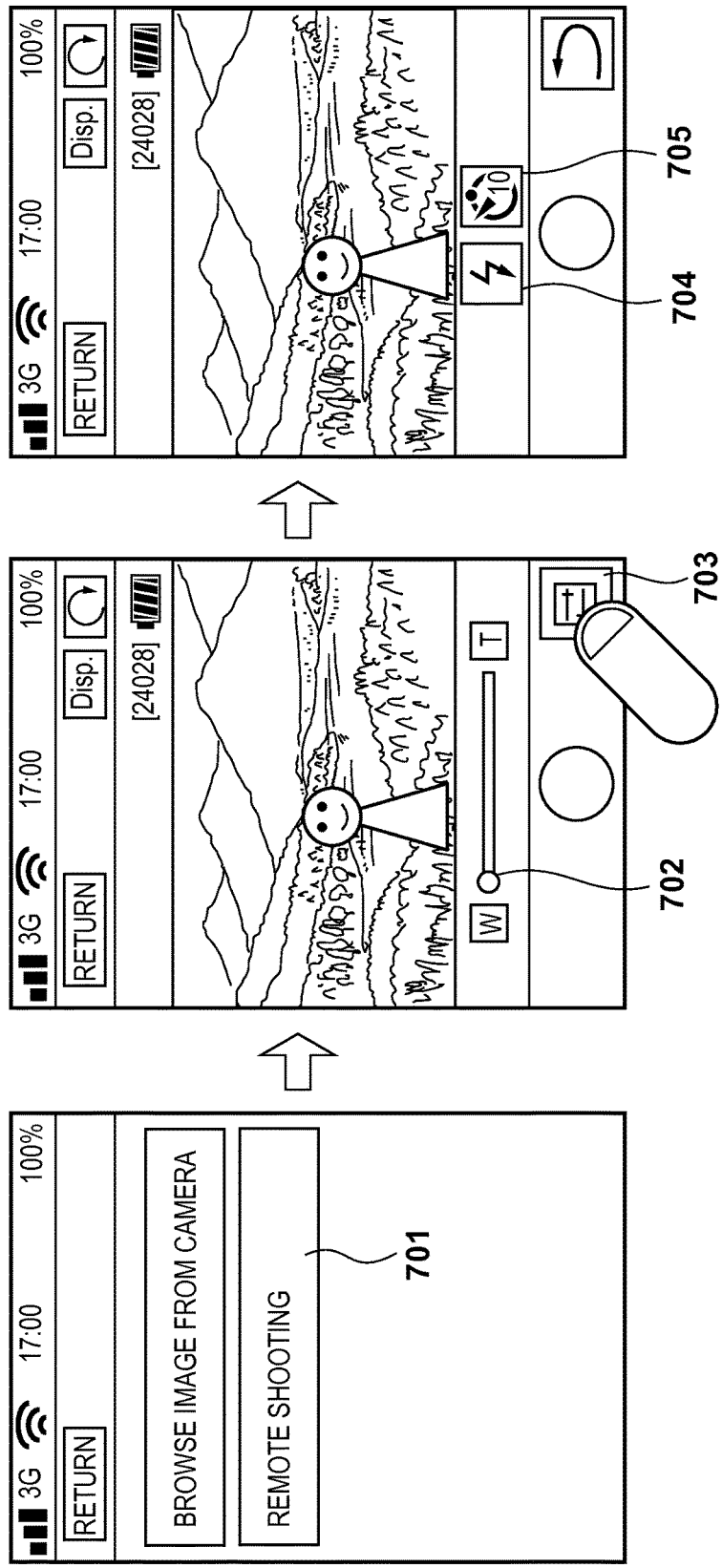

FIG. 9A
FIG. 9B
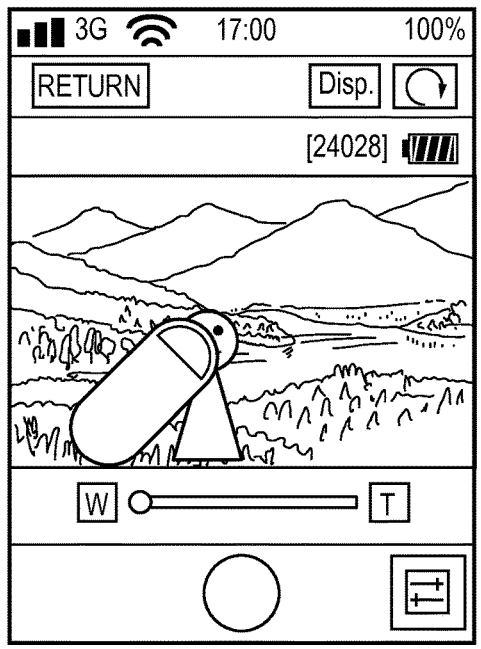
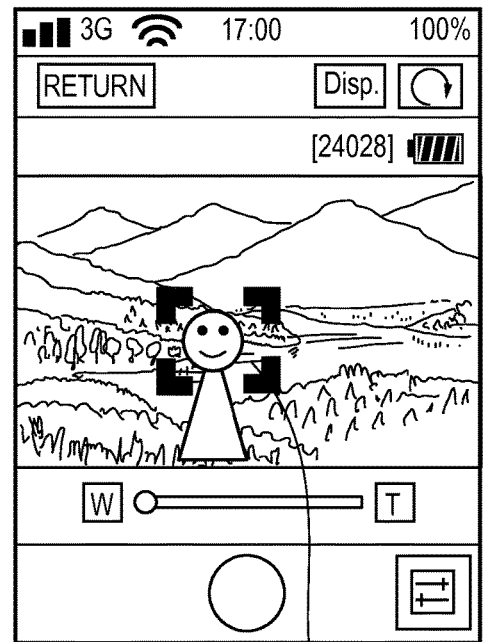
901

_IMAGE CAPTURING APPARATUS CAPABLE OF SPECIFYING AN OBJECT IN IMAGE DATA BASED ON OBJECT DETECTION, MOTION DETECTION AND/OR OBJECT RECOGNITION, COMMUNICATION APPARATUS COMMUNICATING WITH IMAGE CAPTURING APPARATUS, AND CONTROL METHOD THEREFOR_

BACKGROUND OF THE INVENTION

Field of the Invention

The present invention relates to a technique of shooting by externally operating an image capturing apparatus.

Description of the Related Art

Recent digital cameras have functions of detecting the face and motion of a person and identifying a specific person. In various scenes, digital cameras can shoot suitable images upon automatically determining optimal shooting conditions. In addition, with the proliferation of network environments such as wireless LANs, digital cameras which are equipped with a wireless communication function to enable remote shooting by externally operating a smartphone or the like as a remote controller which is communicatively connected via a wireless network, are available.

For example, Japanese Patent Laid-Open No. 2010-050746 discloses a technique of tracking a specific person by detecting a face and the motion of the face from continuously captured images. Japanese Patent Laid-Open No. 2007-325097 discloses a technique of performing remote shooting by externally operating a digital camera using a wirelessly connected PC or the like.

In the automatic shooting mode in which a digital camera automatically determines optimal shooting conditions, it is necessary to execute a face detection function, a motion detection function, and a person recognition function. On the other hand, when performing remote shooting, it is necessary to operate the wireless communication function of the digital camera. However, operating these functions simultaneously will increase power consumption and computation processing load. The increase in power consumption may lead to a decrease in the number of possible shots. The increase in computation processing load may lead to a decrease in the display rate of live view images.

SUMMARY OF THE INVENTION

The present invention has been made in consideration of the aforementioned problems, and realizes a technique of suppressing an increase in power consumption and an increase in computation processing load at the time of remote shooting.

In order to solve the aforementioned problems, the present invention provides an image capturing apparatus comprising: a communication unit configured to communicate with an external apparatus; an image capturing unit configured to generate image data by capturing an object; a setting unit configured to set a shooting condition; a specifying unit configured to specify an object in image data captured by the image capturing unit, wherein the object specified by the specifying unit is used to set the shooting condition by the setting unit; and a control unit configured to control the specifying unit so as to specify the object with less processing when shooting upon receiving an instruction from the external apparatus connected via an the communication unit based on the object specified by the specifying unit as compared to a case in which shooting is performed by directly operating the image capturing apparatus.

In order to solve the aforementioned problems, the present invention provides a communication apparatus comprising: a communication unit configured to communicate with an image capturing apparatus; a reception unit configured to receive image data captured by the image capturing apparatus; a display unit configured to display image data received from the image capturing apparatus; a designation unit configured to designate an object from an image displayed on the display unit; and a transmission unit configured to transmit information of an object designated by the designation unit to the image capturing apparatus.

In order to solve the aforementioned problems, the present invention provides a method of controlling an image capturing apparatus which communicates with an external apparatus, the method comprising steps of: connecting to the external apparatus; generating image data by capturing an object; setting a shooting condition; specifying an object in the captured image data, wherein the specified object is used to set the shooting condition; and performing controlling so as to specify the object with less processing when shooting upon receiving an instruction from the external apparatus connected via a communication unit based on the specified object as compared to a case in which shooting is performed by directly operating the image capturing apparatus.

In order to solve the aforementioned problems, the present invention provides a method of controlling a communication apparatus which communicates with an image capturing apparatus, the method comprising steps of: receiving image data captured by the image capturing apparatus; displaying image data received from the image capturing apparatus; designating an object from an image displayed on the display unit; and transmitting information of a designated object to the image capturing apparatus.

According to the present invention, it is possible to suppress an increase in power consumption and an increase in computation processing load at the time of remote shooting.

Further features of the present invention will become apparent from the following description of exemplary embodiments (with reference to the attached drawings).

BRIEF DESCRIPTION OF THE DRAWINGS

FIGS. 5A to 5C are views each exemplarily showing the display screen of the image capturing apparatus according to this embodiment;

FIG. 6 is a flowchart showing a remote shooting operation according to the first embodiment;

FIGS. 7A to 7C are views each exemplarily showing the display screen of the communication apparatus in the remote shooting mode according to the first embodiment;

FIGS. 9A and 9B are views each exemplarily showing the display screen of a communication apparatus in the remote shooting mode according to the second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

[First Embodiment]

The following will describe a system which uses a digital camera and a smartphone as an image capturing apparatus and a communication apparatus, respectively, according to the present invention, and performs remote shooting by externally operating the image capturing apparatus using the communication apparatus. Note that although a smartphone as a kind of a cellular phone is assumed as a communication apparatus in this embodiment, the embodiment can also be applied to portable electronic devices such as other types of camera-equipped cellular phones and tablet terminals. Furthermore, the embodiment can be applied to information processing apparatuses such as camera-equipped personal computers.

<Explanation of Shooting Modes>

The normal shooting mode and the remote shooting mode according to this embodiment will be described first with reference to FIGS. 1A and 1B.

Figure 1A:
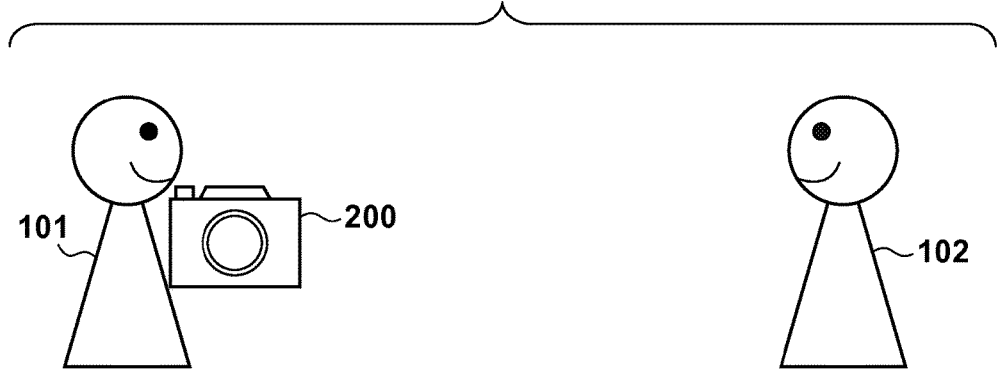
FIGS. 1A and 1B are views for explaining a normal shooting mode and a remote shooting mode according to an embodiment.

FIG. 1A shows a case in the normal shooting mode. FIG. 1B shows a case in the remote shooting mode.

In the normal shooting mode, as shown in FIG. 1A, a photographer 101 and an object 102 are different persons, and the photographer 101 shoots the object 102 by directly operating a digital camera 200.

Figure 1B:
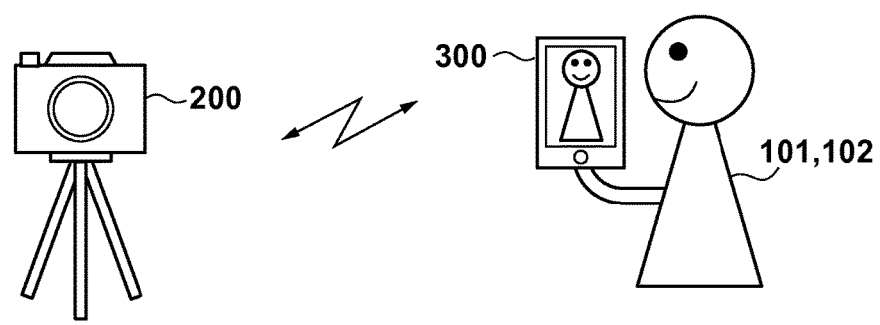

In contrast to this, in the remote shooting mode, as shown in FIG. 1B, the photographer 101 and the object 102 are the same person, and the photographer 101 shoots by remotely operating the digital camera 200 using a smartphone 300 owned by the photographer 101.

As described above, in the remote shooting mode, the photographer 101 wirelessly connects the smartphone 300 to the digital camera 200, and externally operates the digital camera 200 using the smartphone 300. When shooting the object 102, the photographer 101 adjusts the field angle of the digital camera 200 so as to place himself/herself within a frame while looking at the display screen of the smartphone 300, and transmits a shooting instruction to the digital camera 200, thereby shooting himself/herself.

<Configuration of Image Capturing Apparatus>

The configuration and functions of the image capturing apparatus according to an embodiment of the present invention will be described below with reference to FIG. 2.

Figure 2:
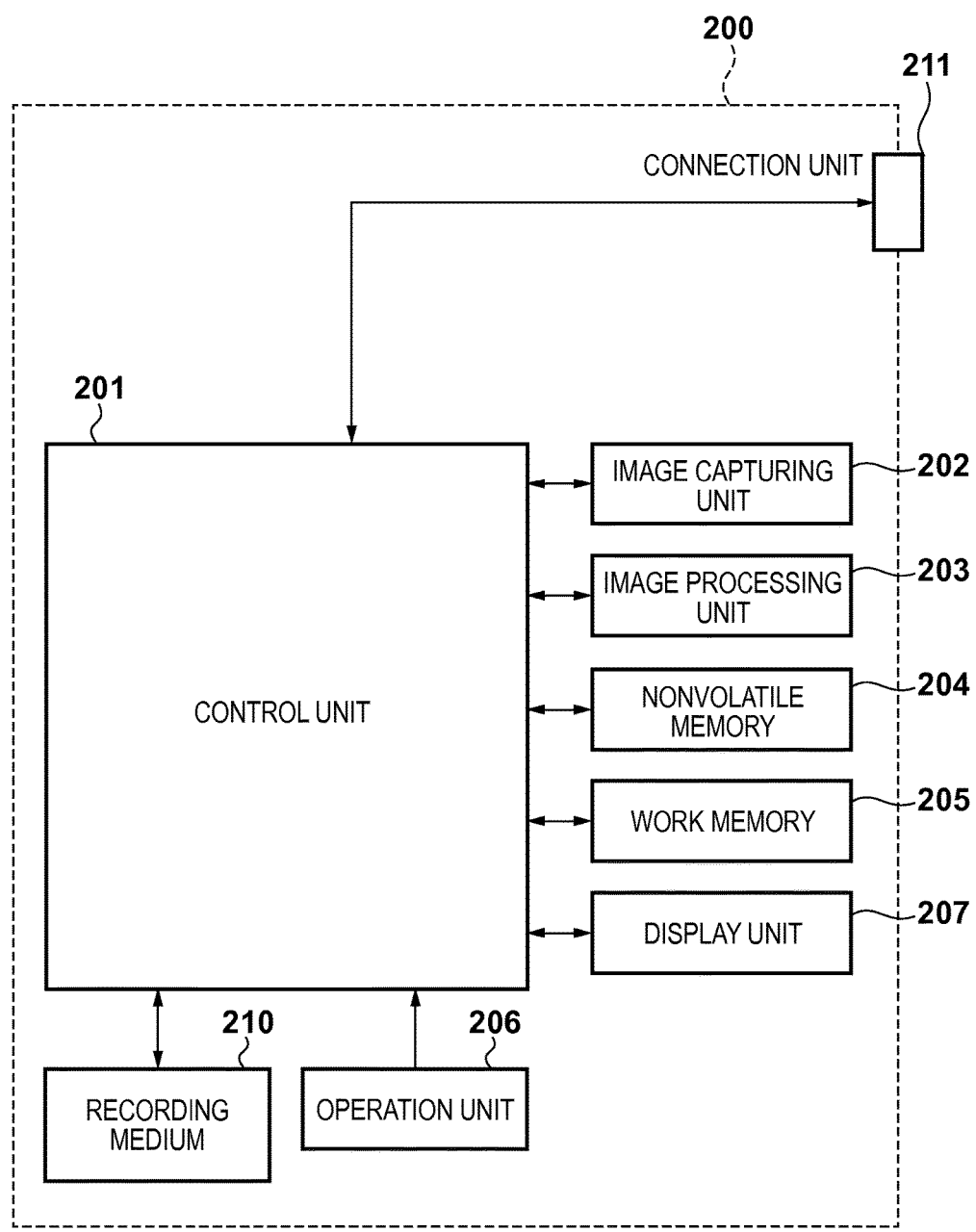
FIG. 2 is a block diagram showing the configuration of an image capturing apparatus according to this embodiment.

Referring to FIG. 2, a control unit 201 is an arithmetic processing unit (CPU) which comprehensively controls the overall digital camera 200, and implements various types of processes in flowcharts (to be described later) by executing programs stored in a nonvolatile memory 204 (to be described later). Note that a plurality of pieces of hardware may control the overall apparatus by sharing processes instead of making the control unit 201 control the overall apparatus.

An image capturing unit 202 includes a lens group including a zoom lens and a focus lens and a shutter having a stop function. The image capturing unit 202 also includes an image sensor formed from a CCD, CMOS device, or the like which converts an object image into an electrical signal, and an A/D converter which converts the analog image signal output from the image sensor into a digital signal.

An image processing unit 203 performs image adjustment processing of adjusting white balance, color, brightness, and the like with respect to the image data captured by the image capturing unit 202, and also performs, for example, resize processing to a display size. The image processing unit 203 also generates an image file by compressing and coding the image data having undergone image adjustment processing by JPEG or the like, and records the file in a recording medium 210. The image processing unit 203 also performs predetermined arithmetic processing by using captured image data. The control unit 201 then controls the focus lens, stop, and shutter of the image capturing unit 202 based on the obtained arithmetic result, thereby performing AF (Auto Focus) processing and AE (Auto Exposure) processing. The image processing unit 203 also detects edge components from image data by using bandpass filters in the horizontal and vertical directions, and performs pattern matching with respect to the detected edge components to extract eye, nose, mouth, and ear candidates, thereby detecting the face of the object. The image processing unit 203 then records the feature information and the like of the detected face in the recording medium 210. In addition, the image processing unit 203 has a function of detecting the motion of an object by extracting a motion vector from the difference between continuously captured image data and a function of recognizing a person corresponding to a detected face by referring to a database in which pieces of feature information of faces are registered. Note that these functions may be executed based on predetermined programs, or circuits for implementing the respective functions may be incorporated in the image processing unit 203. In either case, the image processing unit 203 operates as a way to perform the respective image processes under the control of the control unit 201.

The nonvolatile memory 204 is an electrically erasable/recordable memory, and, for example, an EEPROM is used. Constants, programs, and the like for the operation of the control unit 201 are recorded in the nonvolatile memory 204. In this case, the programs are those for executing the respective flowcharts to be described later in this embodiment.

A work memory 205 is used as a work area where constants and variables for the operation of the control unit 201, programs read out from the nonvolatile memory 204, and the like are loaded. The work memory 205 is also used as a buffer memory for temporarily holding the image data captured by the image capturing unit 202 or an image display memory for a display unit 207.

An operation unit 206 is constituted by operation members such as various types of switches and buttons and a touch panel which receive various types of operations from the user, including, for example, a power switch, a shutter switch, and a mode switch. The mode switch is formed from a rotating dial switch (a mode dial 501 in FIG. 5A), and switches the operation mode of the control unit 201 to a still image recording mode, a moving image recording mode, a playback mode, and the like. The still image recording mode includes modes such as an auto shooting mode, an auto scene discrimination mode, a manual mode (M), a program AE mode (P), a custom mode, and a remote shooting mode. The shutter switch is turned on to generate a first shutter switch signal SW1 when the shutter button provided on the digital camera 200 is operated halfway, that is, half-pressed (shooting preparation instruction). Upon receiving the first shutter switch signal SW1, the control unit 201 controls the image capturing unit 202 to start an operation such as AF (Auto Focus) processing, AE (Auto Exposure) processing, AWB (Auto White Balance) processing, or EF (Electronic Flash) processing. In addition, the shutter switch is turned on to generate a second shutter switch signal SW2 when the shutter button is operated completely, that is, full-pressed (shooting instruction). Upon receiving the second shutter switch signal SW2, the control unit 201 starts a series of shooting operations from reading out a signal from the image capturing unit 202 to writing image data in the recording medium 210.

The display unit 207 displays a viewfinder image at the time of shooting, a captured image, and characters for a dialogical operation. The display unit 207 is, for example, a display device such as a liquid crystal display or organic EL display. The display unit 207 may be integrally formed with the digital camera 200 or an external apparatus connected to the digital camera 200.

The image processing unit 203 records a coded image file in the recording medium 210. The control unit 201 reads out an already recorded image file from the recording medium 210. The recording medium 210 may be a memory card, hard disk drive, or the like mounted in the digital camera 200, or a flash memory or hard disk drive built in the digital camera 200.

A connection unit 211 is an interface for connection to an external apparatus such as the smartphone 300. The digital camera 200 according to this embodiment can exchange data with an external apparatus via the connection unit 211. Note that in this embodiment, the connection unit 211 includes an interface for communication with an external apparatus via a wireless LAN. The control unit 201 implements wireless communication with an external apparatus by controlling the connection unit 211. Note that a communication scheme to be used is not limited to a wireless LAN. For example, USB (Universal Serial Bus) or Bluetooth® can be used. Although it is possible to use short-range communication with a communication distance of about 10 cm, such as NFC (Near Field Communication), it is preferable to use a communication method having a certain communication distance (several m or more) in order to enjoy the merit of remote shooting.

Note that the digital camera 200 according to this embodiment can operate as a slave apparatus in the infrastructure mode of a wireless LAN. When the digital camera 200 operates as a slave apparatus, it can participate in a network formed by a neighboring AP (Access Point) by connecting to the AP. In addition, although the digital camera 200 according to this embodiment is a kind of AP, it can also operate as a simple AP whose function is further limited (to be referred to as a simple AP hereinafter). Note that that the AP in the embodiment is a kind of relay device. When the digital camera 200 operates as a simple AP, the digital camera 200 forms a network by itself. A peripheral apparatus of the digital camera 200 recognizes the digital camera 200 as an AP and can participate in the network formed by the digital camera 200. Assume that the nonvolatile memory 204 holds a program for causing the digital camera 200 to operate in the above manner.

Although the digital camera 200 in this embodiment is a kind of AP, it is a simple AP having no gateway function of transferring the data received from a slave apparatus to an Internet provider or the like. Even if, therefore, the digital camera 200 receives data from another apparatus participating in the network formed by itself, it cannot transfer the data to a network such as the Internet.

<Configuration of Communication Apparatus>

Figure 3:
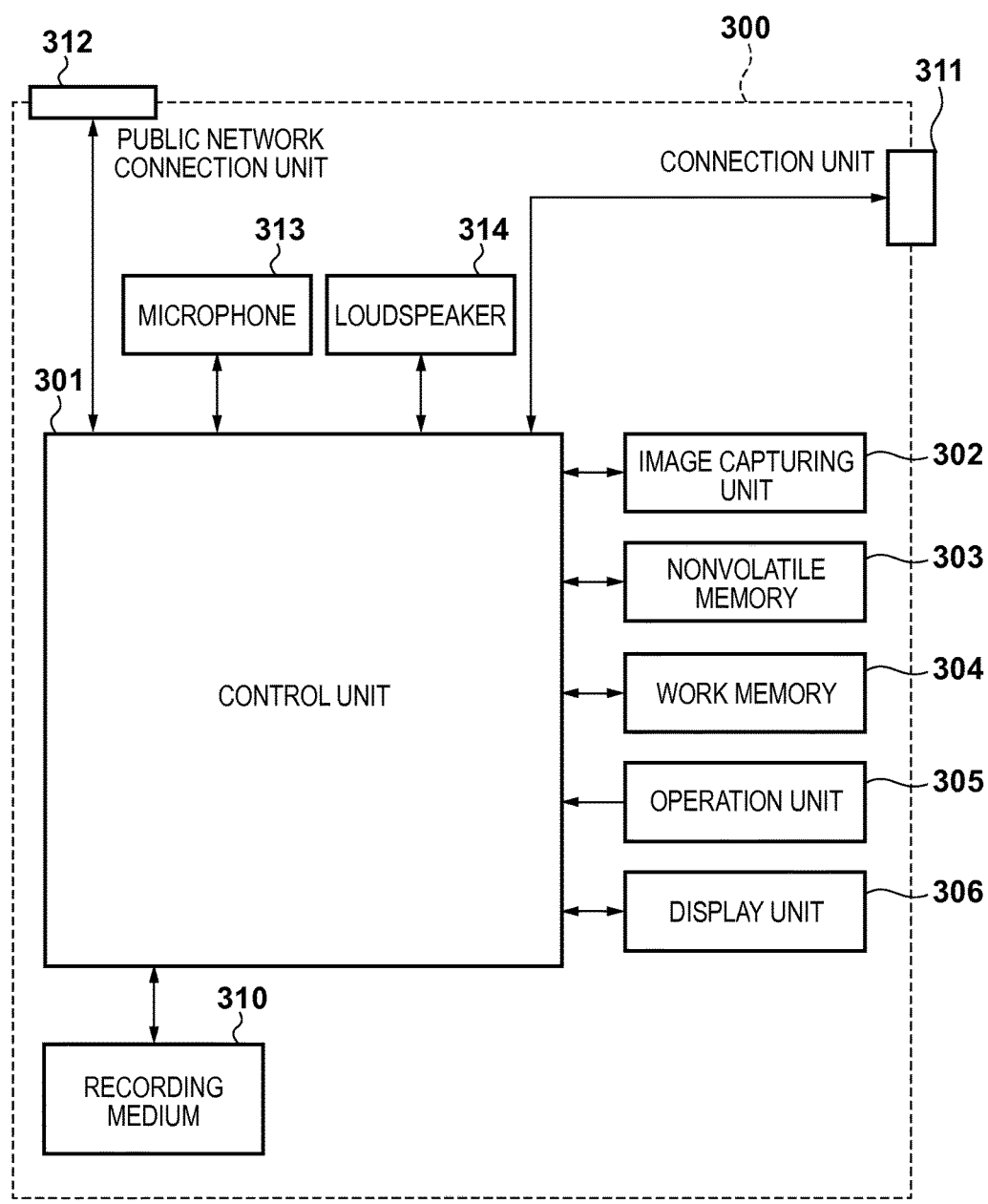
FIG. 3 is a block diagram showing the configuration of a communication apparatus according to this embodiment.

The configuration and functions of the smartphone 300 according to an embodiment to which the communication apparatus according to the present invention is applied will be described with reference to FIG. 3. Although a smartphone will be described as an example of the communication apparatus according to the present invention, the present invention is not limited to this. The present invention can be applied to, for example, a cellular phone, a digital camera with a wireless function, a portable media player, and an information processing apparatus such as a tablet device or PC (Personal Computer).

The smartphone 300 according to this embodiment includes a control unit 301, an image capturing unit 302, a nonvolatile memory 303, a work memory 304, an operation unit 305, a display unit 306, a recording medium 310, and a connection unit 311. The basic functions of the respective elements are the same as those of the digital camera 200, and hence a detailed description of them will be omitted. If a communication apparatus is a PC, it need not include any display unit as long as it includes a display control function which controls the display of the display unit.

Assume that a program for communication with the digital camera 200 is held in the nonvolatile memory 303 and is installed as a camera application. Note that processing in the smartphone 300 according to this embodiment is implemented by reading a program provided by the camera application. Assume that the camera application has a program for the use of the basic function of the OS installed in the smartphone 300. Note that the OS of the smartphone 300 may have a program for implementing processing in this embodiment.

A public network connection unit 312 is an interface used for public wireless communication. The smartphone 300 can communicate with another device via the public network connection unit 312 to perform data communication. When performing voice communication, the control unit 301 inputs and outputs voice signals via a microphone 313 and a loudspeaker 314. Assume that in this embodiment, the public network connection unit 312 includes an interface for performing communication using 3G. Note that it is possible to use another communication scheme such as LTE, WiMAX, ADSL, FTTH, or so-called 4G instead of 3G. In addition, the connection unit 311 and the public network connection unit 312 need not be implemented by independent pieces of hardware. For example, one antenna can have both the functions.

<Shooting Control in Normal Shooting Mode>

The shooting operation performed by the digital camera 200 according to this embodiment in the normal shooting mode (FIG. 1A) will be described next with reference to FIGS. 4A, 4B and 5A to 5C.

Figure 5A:
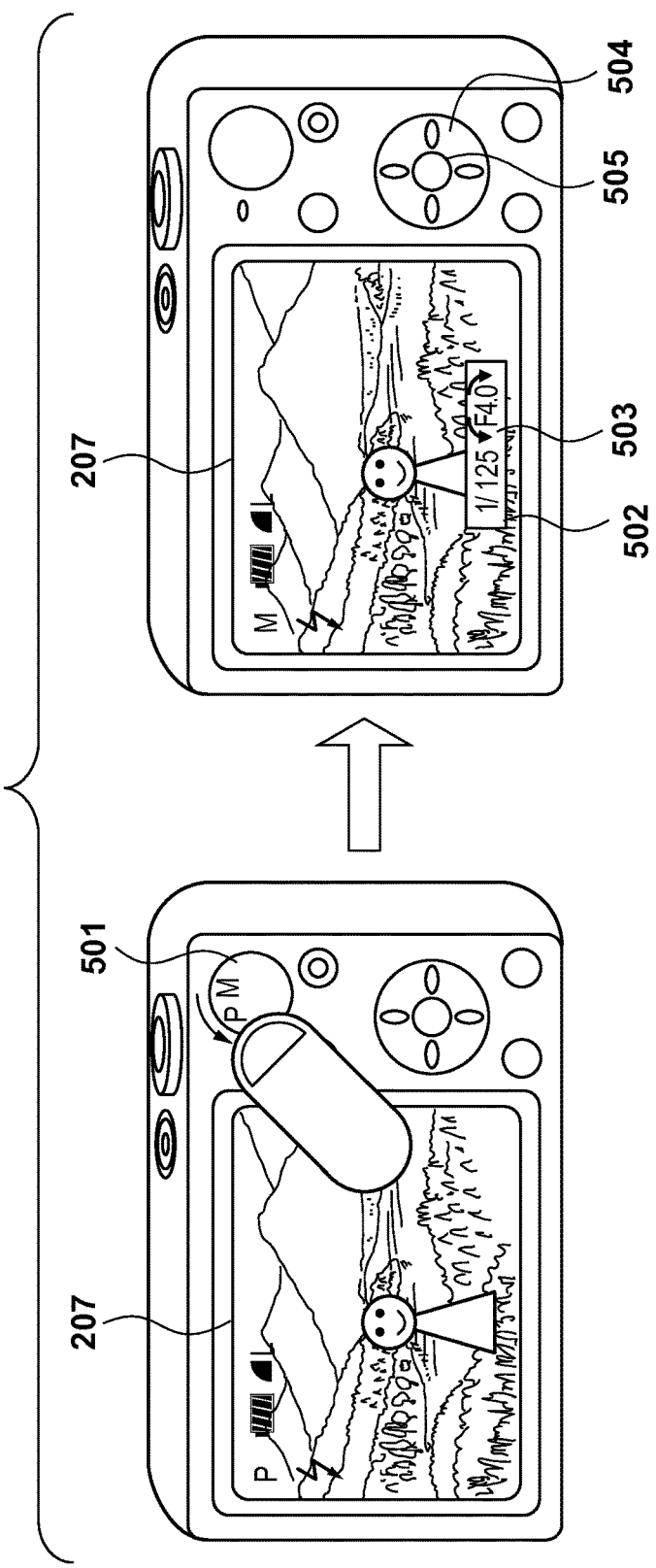

FIGS. 5A to 5C each exemplarily show the viewfinder screen displayed on the display unit 207 of the digital camera 200 in the normal shooting mode. FIG. 5A exemplarily shows the screen to be displayed when changing settings in the exposure control mode. FIG. 5B exemplarily shows the screen to be displayed when changing settings in the white balance control mode. FIG. 5C exemplarily shows the screen to be displayed when changing settings in the focus control mode.

Referring to FIG. 5A, the user can change the program AE mode (P) of automatically making settings in the exposure control mode to the manual mode (M) by rotating a mode dial 501 included in the operation unit 206. In the manual mode (M), the user can set a shutter speed 502 and an f-number (F) 503 displayed on the display unit 207 to desired values by operating a four-way button 504 and a SET button 505. The control unit 201 then shoots under the exposure conditions set by the user.

Referring to FIG. 5B, the user can change the white balance control mode setting from the automatic mode to the manual mode by operating the four-way button 504 so as to select a desired mode from a function menu 506. In the manual mode, the user can designate white data. The control unit 201 shoots with the white balance designated with reference to the white data.

Referring to FIG. 5C, the user can change the focus control mode setting from the automatic mode to the MF (Manual Focus) mode by pressing the manual focus button (a left button 504a of the four-way button 504) included in the operation unit 206. In the MF (Manual Focus) mode, the user can designate a position to be focused by operating the operation unit 206 while looking at a focus indicator 507. The control unit 201 can shoot in accordance with the focusing position designated by the user.

As described above, in the normal shooting mode shown in FIG. 1A, when setting the digital camera 200 in the manual mode, the user can set details of shooting conditions.

<Normal Shooting Operation>

The normal shooting operation performed by the digital camera 200 according to this embodiment will be described with reference to FIGS. 4A and 4B.

Figure 4A:
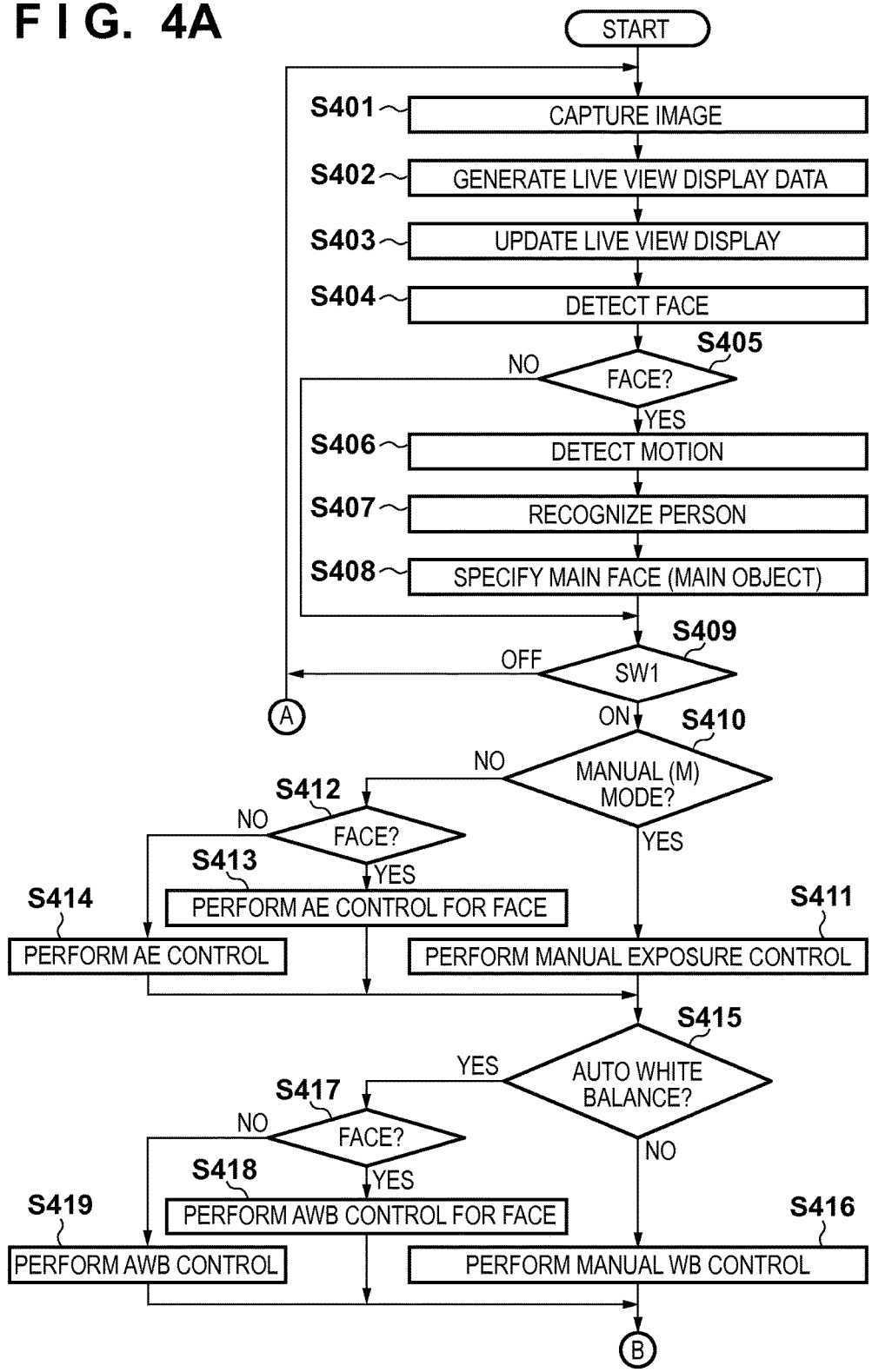
FIGS. 4A and 4B are flowcharts showing a normal shooting operation according to this embodiment.
Figure 4B:
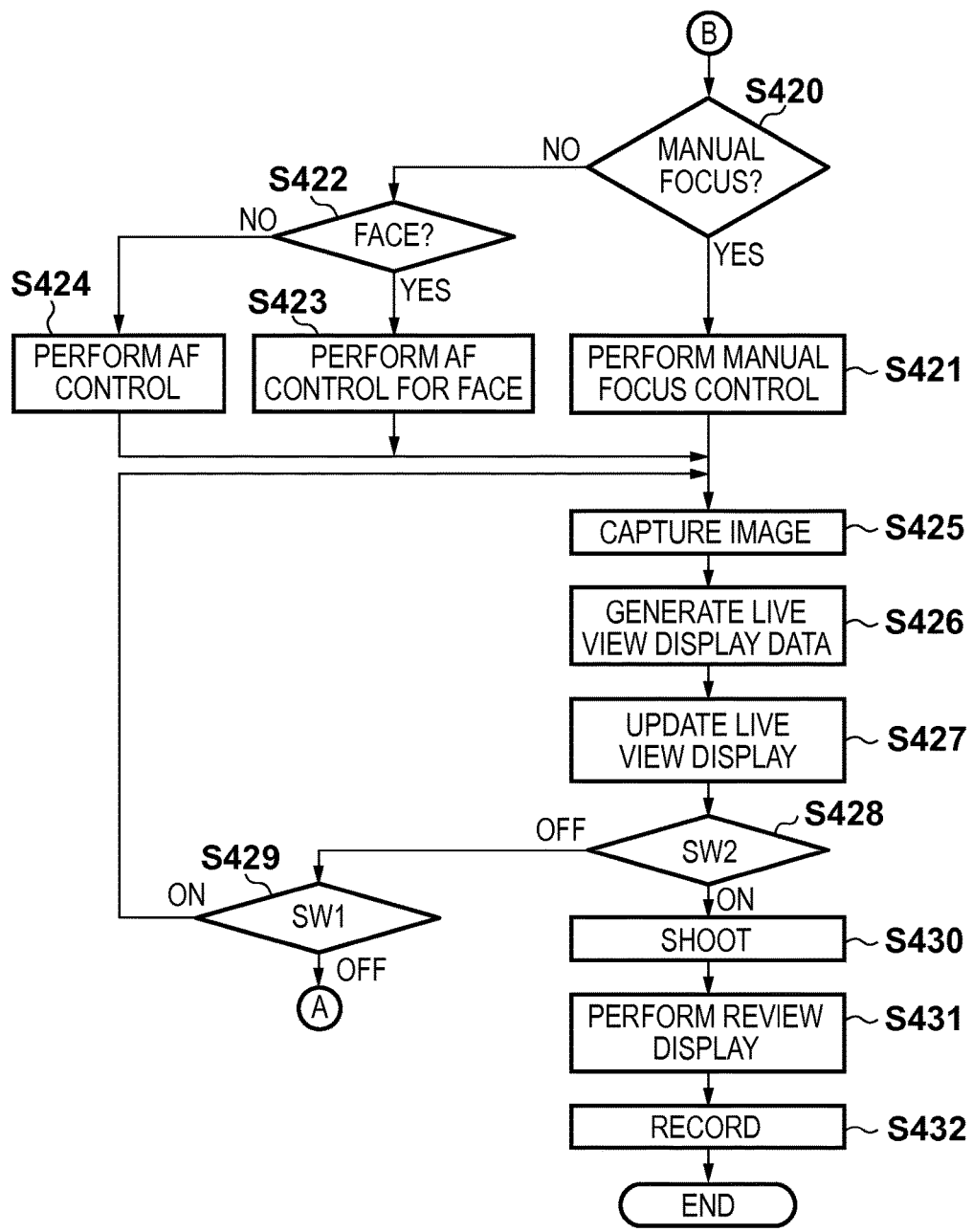

Note that the processing in FIGS. 4A and 4B is implemented by reading out a program stored in the nonvolatile memory 204 into the work memory 205 and making the control unit 201 execute the program. In addition, the processing in FIGS. 4A and 4B starts when the digital camera 200 set in the still image recording mode or the like is activated.

In step S401, the control unit 201 causes the image capturing unit 202 to start capturing an image for live view display.

In step S402, the control unit 201 causes the image processing unit 203 to generate image data for live view display from the image data captured in step S401, and writes the image data in the work memory 205. The control unit 201 also causes the image processing unit 203 to perform image quality adjustment processing of adjusting white balance, color, brightness, and the like with respect to the captured image data, resize processing to a display size, and the like.

In step S403, the control unit 201 displays the live view display image data generated in step S402 on the display unit 207. Every time live view display image data is generated in this manner, the image displayed on the display unit 207 is updated to implement the EVF (Electronic Viewfinder Function).

In step S404, the control unit 201 causes the image processing unit 203 to detect whether the face of a person exists in the display image data generated in step S402 (object detection processing). In this case, the image processing unit 203 detects edge components from the image data using bandpass filters in the horizontal and vertical directions, and performs pattern matching with respect to the detected edge components to extract eye, nose, mouth, and ear candidates, thereby detecting the face of the object. If a face is detected, the control unit 201 stores, in the work memory 205, the position coordinates and size (width/ height) of the detected face region, the number of faces detected, a reliability coefficient, and the like as face information. If no face is detected, the control unit 201 sets 0 as face information in the work memory 205.

In step S405, the control unit 201 refers to the face information stored in the work memory 205 to determine whether any face has been detected in step S404. If no face has been detected, the control unit 201 advances to step S409 without performing any operation. If a face has been detected, the process advances to step S406.

In step S406, the control unit 201 causes the image processing unit 203 to detect a position where the integral value of the difference in luminance signal Y in the face region between the display image data generated in step S402 and image data of the immediately preceding frame becomes minimum and extract a movement amount as a motion vector of the object. This processing is an example of motion detection processing.

In step S407, the control unit 201 causes the image processing unit 203 to perform person recognition processing. In person recognition processing, the control unit 201 extracts feature information of the detected face in the display image data generated in step S402, and compares the information with the feature information of each person stored in the nonvolatile memory 204, thereby determining whether the detected person matches any of registered persons. This processing is an example of object recognition processing.

In step S408, the control unit 201 specifies a main face (main object) based on the face information detected in step S404, the motion vector extracted in step S406, and the person recognition result in step S407.

In step S409, the control unit 201 determines whether the first shutter switch signal SW1 is turned on upon half-pressing of the shutter switch. If the determination result indicates that the first shutter switch signal SW1 is not turned on, the process returns to step S401. If the determination result indicates that the first shutter switch signal SW1 is turned on, the process advances to step S410.

In step S410, the control unit 201 determines whether the exposure control mode is set to the manual mode (M) (FIG. 5A). If the exposure control mode is set to the manual mode (M), the process advances to step S411. If the exposure control mode is not set to the manual mode, the process advances to step S412.

In step S411, the control unit 201 performs exposure control so as to set the shutter speed and f-number of the image capturing unit 202 to the values set by the user. The process then advances to step S415.

In step S412, the control unit 201 refers to the face information stored in the work memory 205 to determine whether any face has been detected in step S404. If the determination result indicates that a face has been detected, the process advances to step S413. If the determination result indicates that no face has been detected, the process advances to step S414.

In step S413, the control unit 201 performs photometric processing for the main face region specified in step S408, and automatically controls the shutter and stop of the image capturing unit 202 to set a shutter speed and an f-number for proper exposure on the main face region.

In step S414, the control unit 201 performs photometric processing for the entire frame and automatically controls the shutter and stop of the image capturing unit 202 so as to set a shutter speed and an f-number for proper exposure.

In step S415, the control unit 201 determines whether the white balance control mode is set to the manual mode (FIG. 5B). If the white balance control mode is set to the manual mode, the process advances to step S416. If the white balance control mode is set to the automatic mode, the process advances to step S417.

In step S416, the control unit 201 controls the color processing settings in the image processing unit 203 to the values set by the user. The process then advances to step S420.

In step S417, the control unit 201 refers to the face information stored in the work memory 205 to determine whether any face has been detected in step S404. If the determination result indicates that a face has been detected, the process advances to step S418. If the determination result indicates that no face has been detected, the process advances to step S419.

In step S418, the control unit 201 automatically adjusts color processing settings in the image processing unit 203 so as to set a proper skin color with respect to the main face region specified in step S408.

In step S419, the control unit 201 automatically adjusts color processing settings in the image processing unit 203 so as to set a proper color.

In step S420, the control unit 201 determines whether the focus control mode is set to the manual mode (FIG. 5C). If the determination result indicates that the focus control mode is set to the manual focus mode, the process advances to step S421. If the focus control mode is set to the auto focus mode, the process advances to step S422.

In step S421, the control unit 201 performs control to focus the focus lens of the image capturing unit 202 at the distance set by the user. The process then advances to step S425.

In step S422, the control unit 201 refers to the face information stored in the work memory 205 to determine whether any face has been detected in step S404. If the determination result indicates that a face has been detected, the process advances to step S423. If the determination result indicates that no face has been detected, the process advances to step S424.

In step S423, the control unit 201 performs distance measurement processing for the main face region specified in step S408, and automatically controls the focus lens of the image capturing unit 202 so as to focus on the main face region.

In step S424, the control unit 201 performs distance measurement processing upon dividing the entire frame into a plurality of blocks, and automatically controls the focus lens of the image capturing unit 202 so as to attain proper focus.

In step S425, as in step S401, the control unit 201 causes the image capturing unit 202 to capture a live view display image.

In step S426, as in step S402, the control unit 201 causes the image processing unit 203 to generate live view display image data on the display unit 207 from the image data captured in step S425, and writes the data in the work memory 205.

In step S427, as in step S404, the control unit 201 displays the live view display image data generated in step S426 on the display unit 207.

In step S428, the control unit 201 determines whether the second shutter switch signal SW2 is turned on upon full-pressing of the shutter switch. If the determination result indicates that the second shutter switch signal SW2 is not turned on, the process advances to step S409. If the determination result indicates that the second shutter switch signal SW2 is turned on, the process advances to step S430.

In step S429, the control unit 201 determines whether the first shutter switch signal SW1 is turned on while the shutter switch is half-pressed. If the determination result indicates that the first shutter switch signal SW1 is not turned on, the process returns to step S401. If the first shutter switch signal SW1 is turned on, the process returns to step S425 to continue processing for the next frame.

In step S430, the control unit 201 performs shooting processing. In shooting processing, the control unit 201 causes the image processing unit 203 to perform various types of processing for the image data captured for a still image by the image capturing unit 202. The control unit 201 then compresses and codes the data by JPEG or the like, and writes the data in the work memory 205.

In step S431, the control unit 201 causes the image processing unit 203 to generate review display image data from the image data captured in step S430, writes the data in the work memory 205, and displays the data on the display unit 207.

In step S432, the control unit 201 records the compressed image data written in the work memory 205 in step S429 as an image file in the recording medium 210, and terminates the shooting operation.

As described above, in a normal shooting operation, it is possible to select between the automatic shooting mode in which shooting conditions relating to an exposure, white balance, and focus are determined by the camera and the manual shooting mode in which shooting conditions are set by the user. In the manual shooting mode, the user can set detailed shooting conditions. In the automatic shooting mode, it is possible to shoot a person with a proper exposure, proper skin color, and proper focus by performing control such as AF control, AE control, and AWB control based on the face information obtained by face detection. In addition, even when the object is moving, a main face can be specified by using the motion vector extracted by motion detection. This makes it possible to shoot the person with a proper exposure, proper skin color, and proper focus. Furthermore, specifying a main face based on a person recognition result makes it possible to shoot a person who is the main object with a proper exposure, proper skin color, and proper focus, even if a person other than the main object exists in the frame and is placed at a position other than the center of the frame.

<Shooting Control in Remote Shooting Mode>

The shooting operation performed by the digital camera 200 according to this embodiment in the remote shooting mode (FIG. 1B) will be described next with reference to FIGS. 6 and 7A to 7C.

FIGS. 7A to 7C each exemplarily show the screen displayed on the display unit 306 of the smartphone 300 in the remote shooting mode. FIG. 7A shows the screen when making settings in the remote shooting mode. FIGS. 7B and 7C each exemplarily show the screen when the user makes zoom, electronic flash, and self-timer settings.

Referring to FIGS. 7A to 7C, when the user activates the camera application installed in the smartphone 300, the camera application displays the GUI shown in FIG. 7A on the display unit 306 so as to allow the user to select. When the user selects a remote shooting button 701 from the GUI displayed on the display unit 306 by touching the button, a captured image is transmitted from the wirelessly connected digital camera 200, and the live view display image shown in FIG. 7B is displayed. The user can set the zoom magnification of the live view image by operating a zoom setting button 702 displayed below the live view image shown in FIG. 7B.

Referring to FIG. 7B, when the user selects a setting button 703 from the GUI displayed on the display unit 306 by touching the button, an electronic flash setting changing button 704 and a self-timer setting button 705 shown in FIG. 7C are displayed. The user can make ON/OFF setting for the electronic flash by touch-operating the electronic flash setting changing button 704, and can make ON/OFF setting for the self-timer by touch-operating the self-timer setting button 705.

The remote shooting mode in this embodiment assumes a use case in which the photographer shoots himself/herself by using the smartphone 300 as a remote controller, and hence it is possible to change the electronic flash and self-timer settings. On the other hand, in the remote shooting mode according to this embodiment, it is only possible to perform automatic shooting while all the shooting conditions relating to exposure control, white balance control, and focus control are determined by the camera, and it is not possible to select manual shooting.

<Remote Shooting Operation>

The remote shooting operation performed by the digital camera 200 according to this embodiment will be described with reference to FIG. 6.

Note that the processing in FIG. 6 is implemented by reading out a program stored in the nonvolatile memory 204 into the work memory 205 and making the control unit 201 execute the program. In addition, the processing in FIG. 6 starts when the digital camera 200 is activated in a state in which the camera application in the smartphone 300 is activated, wireless connection to the smartphone 300 is established, and the still image recording mode or the like is set.

In this case, wireless connection is implemented by making the control unit 201 control the connection unit 211, and includes wireless LAN connection processing of establishing connection to a wireless network and device connection processing of establishing a communication session with a partner device. Wireless connection processing with the smartphone 300 is implemented by, for example, the following processing. First of all, the digital camera 200 searches for a neighboring wireless network to check whether there is any wireless network to be connected. The digital camera 200 then performs wireless LAN connection processing with a desired wireless network, and executes IP address setting processing. Although it is possible to search for a neighboring wireless network and participate in a desired wireless network in the above manner, the digital camera 200 can generate a wireless network by itself. In this case, it is also possible to establish wireless LAN connection by letting the smartphone 300 participate in the wireless network generated by the digital camera 200. Thereafter, the digital camera 200 searches for the smartphone 300 as a connection partner on the connected wireless network. A device search is implemented by a device search protocol such as UPnP (Universal Plug and Play) or mDNS (Multicast DNS). Upon finding the smartphone 300 as a connection partner by device search processing, the digital camera 200 performs device connection processing for establishing a communication session with the smartphone 300.

Referring to FIG. 6, in step S601, the control unit 201 causes the image capturing unit 202 to start capturing a live view display image to be transmitted to the smartphone 300.

In step S602, the control unit 201 causes the image processing unit 203 to perform various types of processing for the image data captured by the image capturing unit 202, and then compresses and codes the data by JPEG or the like. The control unit 201 generates image data for live view display (to be referred to as remote display hereinafter) to be transmitted to the smartphone 300, and writes the data in the work memory 205.

In step S603, the control unit 201 determines whether it has received a transmission request for the remote display image data from the smartphone 300. If the determination result indicates that no transmission request has been received, the process advances to step S605. If the determination result indicates that a transmission request has been received, the process advances to step S604.

In step S604, the control unit 201 transmits the remote display image data written in the work memory 205 in step S602 to the smartphone 300. As described above, the digital camera 200 can perform live view display on the display unit 306 of the smartphone 300 by transferring the remote display image data to the smartphone 300.

In step S605, the control unit 201 causes the image processing unit 203 to detect whether the face of a person exists in the display image data generated in step S602.

In step S606, the control unit 201 refers to the face information stored in the work memory 205 to determine whether any face has been detected in step S605. If the determination result indicates that no face has been detected, the process advances to step S608. If the determination result indicates that a face has been detected, the process advances to step S607.

In step S607, the control unit 201 specifies a main face (main object) based on the face information detected in step S605. Note that in this flowchart, motion detection or person recognition is not used to specify a main face.

In step S608, the control unit 201 determines whether it has received a shooting request from the smartphone 300. If the determination result indicates that a still image shooting request has been received, the process advances to step S609. If the determination result indicates that no still image shooting request has been received, the process returns to step S601 to continue processing for the next frame.

In step S609, the control unit 201 refers to the face information stored in the work memory 205 to determine whether any face has been detected in step S605. If the determination result indicates that a face has been detected, the process advances to step S610. If the determination result indicates that no face has been detected, the process advances to step S613.

In step S610, the control unit 201 performs photometric processing for the main face region specified in step S607, and automatically controls the shutter and stop of the image capturing unit 202 so as to set a shutter speed and an f-number for proper exposure on the main face region.

In step S611, the control unit 201 automatically adjusts color processing settings in the image processing unit 203 so as to set a proper skin color with respect to the main face region specified in step S607.

In step S612, the control unit 201 performs distance measurement processing for the main face region specified in step S607, and automatically controls the focus lens of the image capturing unit 202 so as to focus on the main face region. The process then advances to step S616.

In step S613, the control unit 201 performs photometric processing for the entire frame and automatically controls the shutter and stop of the image capturing unit 202 so as to set a shutter speed and an f-number for proper exposure.

In step S614, the control unit 201 automatically adjusts color processing settings of the image processing unit 203 so as to set a proper color.

In step S615, the control unit 201 performs distance measurement processing upon dividing the entire frame into a plurality of blocks, and automatically controls the focus lens of the image capturing unit 202 so as to attain proper focus. The process then advances to step S616.

In step S616, the control unit 201 causes the image processing unit 203 to perform various types of processing for the image data captured for a still image by the image capturing unit 202, compresses and codes the data by JPEG or the like, and writes the data in the work memory 205.

In step S617, the control unit 201 records the compressed image data written in the work memory 205 in step S616 as an image file in the recording medium 210.

In step S618, the control unit 201 determines whether it has received a transmission request for the shot image from the smartphone 300. If the determination result indicates that a transmission request has been received, the process advances to step S619. If the determination result indicates that no transmission request has been received, the processing is terminated.

In step S619, the control unit 201 transmits the compressed image data recorded in the recording medium 210 in step S617 to the smartphone 300. The smartphone 300 records the compressed image data received from the digital camera 200 in the recording medium 310.

As described above, in remote shooting according to this embodiment, it is only possible to perform automatic shooting in which all the shooting conditions relating to exposure control, white balance control, and focus control are determined by the camera, and it is not possible to select manual shooting. In addition, remote shooting assumes a use case in which the photographer shoots himself/herself by remotely controlling the smartphone 300, and hence there is no need to consider a case in which an object is moving or a person other than a main object exists in the frame and is placed at a position other than the center of the frame. This increases the possibility of successfully shooting a person with a proper exposure, proper skin color, and proper focus by performing control such as AF control, AE control, and AWB control based on the face information obtained by face detection without performing any motion detection or person recognition as in a normal shooting operation.

As described above, in remote shooting according to this embodiment, it is possible to suppress a decrease in the number of possible shots caused by an increase in power consumption and a decrease in the display rate of remote display images caused by an increase in computation processing load by not performing motion detection or person recognition which has little influence on shooting.

[Second Embodiment]

The second embodiment will exemplify a case in which the user designates a main object without motion detection or person recognition by a digital camera 200.

In this embodiment, a main object can be designated by operating a smartphone 300 on which a remote display image is displayed. This makes it possible to shoot a main object with a proper exposure, proper skin color, and proper focus by performing control such as AF control, AE control, and AWB control based on the designated main object information. In addition, since face detection is executed for only a designated main object without performing motion detection or person recognition, it is possible to decrease power consumption and computation processing load.

<Shooting Control in Remote Shooting Mode>

The shooting operation performed by the digital camera 200 according to this embodiment in the remote shooting mode (FIG. 1B) will be described with reference to FIGS. 8, 9A, and 9B.

FIGS. 9A and 9B each exemplarily show the screen displayed on a display unit 306 of the smartphone 300 in the remote shooting mode. FIG. 9A shows a user operation and the screen when designating a main object. FIG. 9B exemplarily shows the screen displayed to make it possible to identify the main object designated by the user.

When the user touches the position which he/she wants to designate as a main object while looking at the live view image displayed on the display unit 306 of the smartphone 300 as shown in FIG. 9A, a frame 901 indicating the main object is displayed at the touched position on the display unit 306. When a main object is designated, the information of the main object region is transmitted from the smartphone 300 to the digital camera 200. The digital camera 200 can shoot the main object with a proper exposure, proper color, and proper focus by performing control such as AF control, AE control, and AWB control based on the object information detected from the designated main object region.

<Remote Shooting Operation>

The remote shooting operation performed by the digital camera 200 according to this embodiment will be described with reference to FIG. 8.

Figure 8:
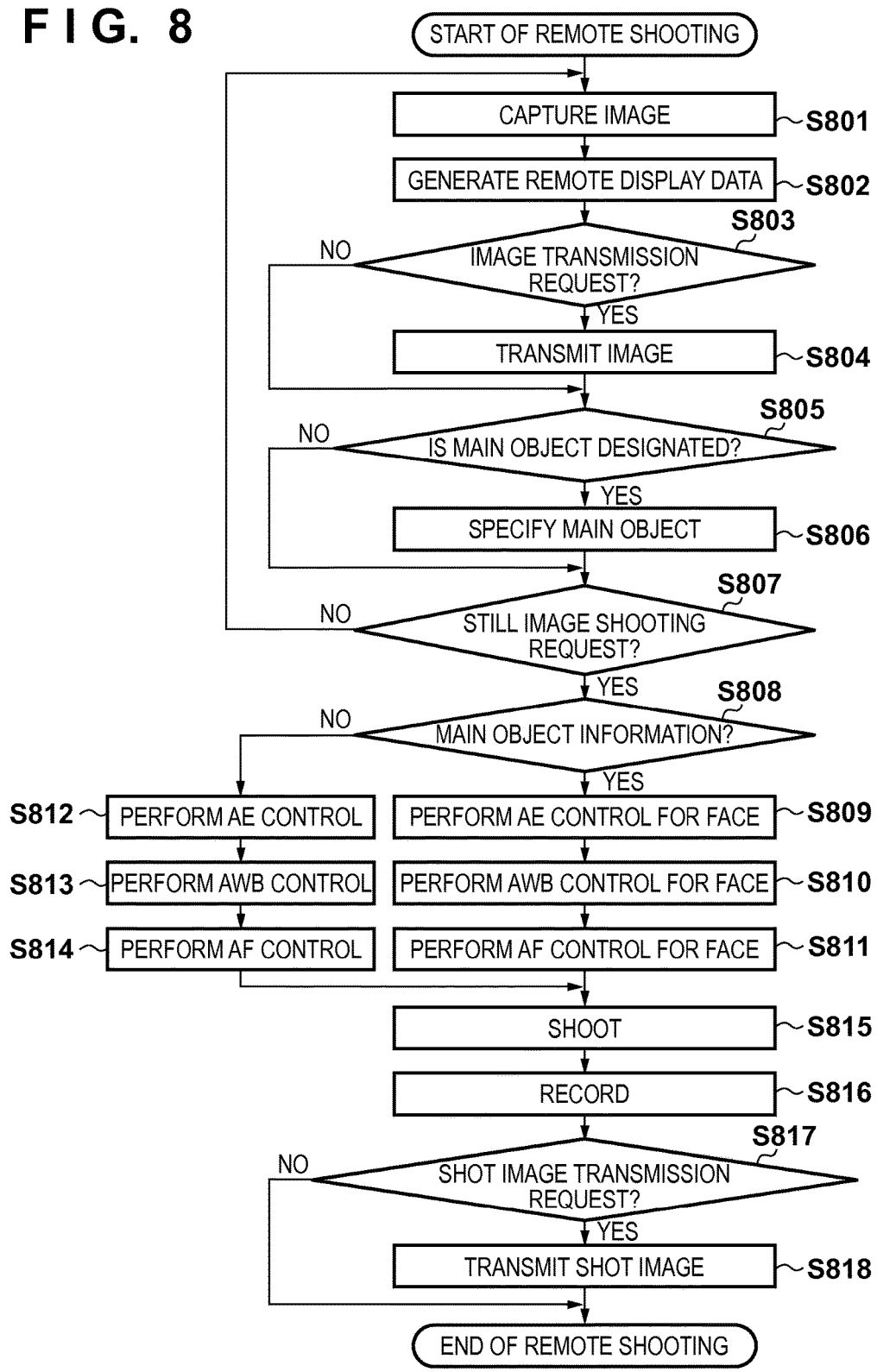
FIG. 8 is a flowchart showing a remote shooting operation according to the second embodiment.

Note that the processing in FIG. 8 is implemented by loading a program stored in a nonvolatile memory 204 into a work memory 205 and making a control unit 201 execute the program. In addition, the processing in FIG. 8 starts when the digital camera 200 is activated in a state in which the camera application in the smartphone 300 is activated, wireless connection to the smartphone 300 as a remote controller is established, and the still image recording mode or the like is set.

Note that steps S801 to S804, S807, and S809 to S818 in FIG. 8 are the same as steps S601 to S604, S608, and S610 to S619 in FIG. 6. Differences from FIG. 6 will be mainly described below.

Referring to FIG. 8, in step S805, the control unit 201 determines whether it has received the information of a main object region from the wirelessly connected smartphone 300, that is, whether a main object region has been designated. If the determination result indicates that no main object region has been designated, the process advances to step S807. If the determination result indicates that a main object region has been designated, the process advances to step S806.

In step S806, the control unit 201 specifies a main object based on the information of the main object region received from the smartphone 300, and stores the position coordinates and the size (width/height) as main object information in the work memory 205. Note that the control unit 201 performs face detection with respect to the main object region and stores the position coordinates and size (width/height) of the detected face region as face information in the work memory 205. If no face is detected, the control unit 201 stores 0 as face information in the work memory 205.

Subsequently, upon reception of a shooting request from the smartphone 300 in step S807, the process advances to step S808, in which the control unit 201 refers to the main object information stored in the work memory 205 to determine whether there is main object information. If the determination result indicates that there is main object information, the process advances to step S809. If the determination result indicates that there is no main object information, the control unit 201 executes processing in steps S812 to S818.

In step S809, the control unit 201 refers to the main object information stored in the work memory 205 to perform photometric processing for the main object region. The control unit 201 then automatically controls the shutter and stop of the image capturing unit 202 so as to set a shutter speed and an f-number for proper exposure with respect to the main object region.

In step S810, the control unit 201 refers to the main object information stored in the work memory 205 to automatically adjust color processing settings of the image processing unit 203 so as to set a proper color with respect to the main object region.

In step S811, the control unit 201 refers to the main object information stored in the work memory 205 to perform distance measurement processing for the main object region, and automatically controls the focus lens of the image capturing unit 202 so as to focus on the main object region.

Subsequently, the control unit 201 executes processing in steps S815 to S818.

As has been described above, in a remote shooting operation according to this embodiment, motion detection or person recognition is not performed, and face detection is performed only for the main object designated by the user. By allowing the main object to be designated from the smartphone 300 in this way, it is possible to shoot a main object with a proper exposure, proper color, and proper focus by performing control such as AF control, AE control, and AWB control based on designated main object information. In addition, since face detection is performed only for the main object designated by the user without any motion detection or person recognition, it is possible to further decrease power consumption and computation processing load.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-257399, filed Dec. 12, 2013 which is hereby incorporated by reference herein in its entirety.

What is claimed is:

1. An image capturing apparatus comprising:
a communication unit configured to communicate with an external apparatus;
an image capturing unit configured to generate image data by capturing an object;
a setting unit configured to set a shooting condition;
a specifying unit configured to specify an object in image data captured by the image capturing unit,
wherein the object specified by the specifying unit is used to set the shooting condition by the setting unit; and
a shooting control unit configured to control shooting based on the shooting condition set in accordance with an object specified by the specifying unit,
wherein processing for specifying the object by the specifying unit is configured to use a result of object detection processing of detecting a feature of an object and at least one of results of motion detection processing of detecting a motion of the object and object recognition processing of determining whether the object detected by the motion detection processing is a predetermined object, when shooting upon reception of an instruction by directly operating the image capturing apparatus, and
wherein processing for specifying the object by the specifying unit is configured to use a result of the motion detection processing and not to use a result of the object recognition processing, when shooting upon reception of an instruction from the external apparatus connected via the communication unit.

2. The apparatus according to claim 1, further comprising a selection unit configured to select a normal shooting mode of shooting by making the photographer directly operate the image capturing apparatus and a remote shooting mode of shooting upon reception of an instruction from the external apparatus connected via the communication unit,
wherein when shooting in the normal shooting mode, the specifying unit specifies an object by using the results of the object detection processing, the motion detection processing, and the object recognition processing, and
when shooting in the remote shooting mode, the specifying unit specifies an object by using the result of the object detection processing without using the results of the motion detection processing and the object recognition processing.

3. The apparatus according to claim 1, wherein the external apparatus includes a display unit configured to display image data captured by the image capturing unit and a designation unit configured to designate an object from an image displayed on the display unit, and
in the image capturing apparatus, the specifying unit specifies an object based on designation by the designation unit.

4. The apparatus according to claim 1, further comprising a selection unit configured to select a shooting mode,
wherein the selection unit is configured to select automatic shooting of automatically setting the shooting condition and manual shooting configured to allow a user to manually set the shooting condition, and
the selection unit makes one of the automatic shooting and the manual shooting selectable when shooting in the normal shooting mode, and makes the manual shooting unselectable when shooting in a remote shooting mode.

5. The apparatus according to claim 1, wherein the shooting condition includes information relating to at least one of exposure control, focus control, and white balance control.

6. The apparatus according to claim 1, wherein in the object detection processing, a face of a person is detected.

7. The apparatus according to claim 1, further comprising:
a first transmission unit configured to transmit image data captured by the image capturing unit to the external apparatus upon reception of a transmission request from the external apparatus;
a recording unit configured to record image data captured by the image capturing unit upon reception of a shooting instruction from the external apparatus; and
a second transmission unit configured to transmit image data recorded in the recording unit to the external apparatus upon reception of a transmission request from the external apparatus.

8. A method of controlling an image capturing apparatus which communicates with an external apparatus, the method comprising steps of:
connecting to the external apparatus;
generating image data by capturing an object;
setting a shooting condition;
specifying an object in the captured image data,
wherein the specified object is used to set the shooting condition; and
controlling shooting based on the shooting condition set in accordance with an object specified in the specifying step;
wherein processing for specifying the object is configured to use a result of object detection processing of detecting a feature of an object and at least one of results of motion detection processing of detecting a motion of the object and object recognition processing of determining whether the object detected by the motion detection processing is a predetermined object, when shooting upon reception of an instruction by directly operating the image capturing apparatus, and
wherein processing for specifying the object is configured to use a result of the motion detection processing and not to use a result of the object recognition processing, when shooting upon reception of an instruction from the external apparatus connected via the communication unit.

9. A non-transitory computer-readable storage medium storing a program for causing a computer to execute the control method, the method comprising steps of:
connecting to the external apparatus;
generating image data by capturing an object;
setting a shooting condition;
specifying an object in the captured image data,
wherein the specified object is used to set the shooting condition; and
controlling shooting based on the shooting condition set in accordance with an object specified in the specifying step;
wherein processing for specifying the object is configured to use a result of object detection processing of detecting a feature of an object and at least one of results of motion detection processing of detecting a motion of the object and object recognition processing of determining whether the object detected by the motion detection processing is a predetermined object, when shooting upon reception of an instruction by directly operating the image capturing apparatus, and
wherein processing for specifying the object is configured to use a result of the motion detection processing and not to use a result of the object recognition processing, when shooting upon reception of an instruction from the external apparatus connected via the communication unit.

* * * * *